Patented July 14, 1931

1,813,953

UNITED STATES PATENT OFFICE

WALTER REPPE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF KETONES

No Drawing. Application filed December 27, 1928, Serial No. 328,857, and in Germany January 21, 1928.

The present invention relates to the production of ketones.

I have found that ketones can be prepared in a simple manner by passing glycols, in vaporized form, over catalytic masses which may contain activating agents having an alkaline reaction. The said catalytic masses comprise the heavy metals of groups 1 and 8 of the periodic system, or mixtures or compounds of the same. Among the great number of such catalysts those consisting of, or comprising copper are most efficient. The alkaline activating agents comprise, for example oxides, hydroxides, carbonates, formates, acetates, oxalates, phosphates or silicates of the alkali metals or alkaline earth metals, which are alkaline or are split into alkaline compounds under the conditions of working, which compounds for the sake of brevity will be referred to in the following as alkaline activators. The quantity employed of these alkaline activators depends on the one hand on the degree of alkalinity of the single compound, strongly alkaline compounds being used in a smaller quantity than less alkaline compounds, and on the other hand on the materials to be acted upon and on the physical conditions of working.

It is often advantageous to add to the catalytic masses small amounts of a second class of activating agents, consisting of difficultly reducible metal oxides such as the oxides of thorium, aluminium, tungsten, chromium, silicon, cerium, titanium, manganese, magnesium and the like, or mixtures thereof as promoters. The catalysts are preferably deposited on carriers such as pumice, fuller's earth, diatomaceous earth and the like and can be fixed thereon by means of any suitable binding agent such as water-glass, colloidal silica, aqueous sugar solutions and the like. The reaction may be carried out in the presence or absence of a non-oxidizing diluent, such as steam, or gases, such as nitrogen, hydrogen or the like or mixture of these. Generally it is preferable to work in a cycle, when such diluents are employed.

The temperatures employed are preferably within the range of from about 150 to 300° centigrade and depend on the catalytic mass employed and on the initial material to be acted upon. In most cases working at a temperature of from about 180 to 250° centigrade will produce the best results.

The process can be performed also at a pressure above atmospheric pressure such as up to about 1 atmosphere, but generally working at atmospheric pressure is sufficient; on the other hand the pressure during the reaction can be reduced more or less, in which case however a suitable cooling device must be arranged in the rear of the reaction chamber.

The aforedescribed process allows of producing ketones not only from 1.2-glycols but also from 1.3-glycols, the hydroxyl groups of which are not attached to adjacent carbon atoms, from which latter glycols hitherto ketones could not be obtained at all or only with very low yields.

The following examples will further illustrate the nature of the invention which however is not restricted to these examples. The parts by weight and volume are calculated by the metric system.

Example 1

Vaporized 1.3-butyleneglycol is passed (at the rate of 100 grams per hour and per liter of contact space) at about 220° centigrade, over a catalyst prepared by depositing an intimate mixture of 200 parts by weight of precipitated basic copper carbonate (with about 50 per cent of copper) and calcium silicate on 1000 parts by volume of granulated pumice, and by a subsequent reduction at about 200° centigrade in a current of hydrogen. The requisite amount of calcium silicate per liter of contact mass is obtained by completely precipitating a solution of 20 grams of dry water glass in about 10 litres of water, with a solution of calcium nitrate, followed by repeated decantation and careful washing. The products leaving the contact chamber are condensed, except for small amounts of hydrogen due to secondary reactions, in a condenser. A yield of methylethyl ketone corresponding to about 70 per cent of the theoretical yield can be recovered, by distillation, from the condensate which contains, in addition to water, a little acetaldehyde, ethyl alcohol and butyraldehyde. Instead of the calcium silicate an equivalent amount of secondary or tertiary sodium phosphate or of secondary calcium phosphate can be employed.

Example 2

2-methyl-1.3-butyleneglycol is passed, as described in Example 1, at 220° centigrade over a catalyst prepared by depositing 200 parts by weight of basic copper carbonate on 1000 parts by volume of pumice, 15 grams of dry water glass per liter of pumice granules being employed, together with the necessary amount of water. A yield of methyl-isopropyl ketone as good as that stated in Example 1 is obtained, with small amounts of by-products.

Example 3

100 parts of finely dispersed cupric oxide and 35 parts of wet alumina, obtained by stirring aluminium sulphate into a hot 15 per cent aqueous solution of ammonia are deposited together with 100 parts of a 1.5 per cent aqueous solution of colloidal silica on small grains of aluminium. After drying the catalytic mass and reducing it at about 230° centigrade in a current of hydrogen, 1.3-butyleneglycol is passed thereover at a speed of 150 grams per hour per each liter of contact space. Methyl-ethyl ketone is obtained in about the same yield as stated in the foregoing examples and the catalytic mass sustains its high activity for a very long time.

If the vapors of the initial glycol are mixed with hydrogen corresponding to a quantity of from 30 to 60 liters per hour and per liter of contact space, the aldehydes present are conjointly hydrogenated into the corresponding alcohols. When working in this manner a reaction product is obtained which, after drying and distilling, consists of a mixture of about 80 per cent of methyl-ethyl ketone and 20 per cent of ethyl alcohol. This mixture is highly suitable in the production of dopes of aircraft especially in a tropical climate.

Example 4

A catalytic mass is prepared by depositing a mixture of 200 parts by weight of basic copper carbonate with a copper content of 50 per cent and 60 parts by weight of an aqueous 20 per cent solution of water glass on each 1000 parts by volume of granulated pumice, whereupon the mass is reduced in a current of hydrogen at about 200° centigrade. 2.4-pentandiol in the vaporous state is then passed at 210° centigrade over the aforedescribed catalytic mass (at a rate of 100 per grams per hour and per each liter of contact space). The reaction product contains methyl-propyl ketone, acetone and a small quantity of acetaldehyde and isopropyl alcohol besides some water.

Example 5

Trimethylene glycol in the vaporous state is passed (at a rate of 80 grams per hour and per liter of contact space) over a catalytic mass prepared by depositing a mixture of 300 parts by weight of cupric oxide and 15 parts by weight of cerium oxide on 1000 parts by volume of granulated pumice by means of 300 parts by weight of an about 3 per cent aqeuos colloidal silicic acid and reducing the mass in a current of hydrogen at about 200° centigrade. The condensate is free from aldehyde and consists mainly of methyl-isopropyl ketone and some water.

If $\alpha$-methyl-$\beta'\beta$-diethyl-ethylene glycol is employed as initial material asymmetric diethyl acetone is obtained.

Example 6

150 parts of copper carbonate are intensely ground together with 20 parts of nickel carbonate whereupon the mixture is heated in a muffle furnace at 290° centigrade in a current of air for a considerable time. The mixture of oxides obtained is then deposited on 300 parts by volume of granulated pumice by means of 150 parts by weight of a 2 per cent solution of colloidal silica whereupon the mass is reduced at 230° centigrade in a current of hydrogen. Over the catalyst, prepared in the aforedescribed manner, vapors of butylene glycol are passed at 215° centigrade in the manner described in Example 3. After removing water and aldehydes from the condensate methyl-ethyl ketone is obtained in a yield of about 70 per cent of the theoretical yield.

What I claim is:

1. The process for the production of ketones, which comprises passing vapors of a glycol containing at least three carbon atoms, the hydroxyl-bearing carbon atoms of which are separated at the most by one methylene group at about from 150° to 300° C. over a catalytic mass comprising a heavy metal of groups 1 and 8 of the periodic system deposited on a carrier.

2. The process for the production of ketones, which comprises passing vapors of a glycol containing at least three carbon atoms, the hydroxyl-bearing carbon atoms of which are separated at the most by one methylene group, at about from 150° to 300° C. over a catalytic mass comprising a heavy metal of groups 1 and 8 of the periodic system.

3. The process for the production of ketones, which comprises passing vapors of a glycol containing at least three carbon atoms, the hydroxyl-bearing carbon atoms of which are separated at the most by one methylene group, at about from 150° to 300° C. over a catalytic mass comprising a heavy metal of groups 1 and 8 of the periodic system and an alkaline activator.

4. The process for the production of ketones, which comprises passing vapors of a glycol containing at least three carbon atoms, the hydroxyl-bearing carbon atoms of which are separated at the most by one methylene group, at about from 150° to 300° C. over a catalytic mass comprising a heavy metal of groups 1 and 8 of the periodic system, an alkaline activator and a difficultly reducible metal oxide.

5. The process for the production of ketones, which comprises passing vapors of a glycol containing at least three carbon atoms, the hydroxyl-bearing carbon atoms of which are separated at the most by one methylene group in mixture with a gaseous non-oxidizing diluent at about from 150° to 300° C. over a catalytic mass comprising a heavy metal of groups 1 and 8 of the periodic system.

6. The process for the production of ketones, which comprises passing vapors of a glycol containing at least three carbon atoms, the hydroxyl-bearing carbon atoms of which are separated at the most by one methylene group at about from 150° to 300° C. over a catalytic mass comprising copper.

7. The process for the production of ketones, which comprises passing vapors of a glycol containing at least three carbon atoms, the hydroxyl-bearing carbon atoms of which are separated at the most by one methylene group at about from 150° to 300° C. over a catalytic mass comprising copper and an alkaline activator.

8. The process for the production of ketones, which comprises passing vapors of a glycol containing at least three carbon atoms, the hydroxyl-bearing carbon atoms of which are separated at the most by one methylene group at about from 150° to 300° C. over a catalytic mass comprising copper, an alkaline activator and a difficultly reducible metal oxide.

9. The process for the production of ketones, which comprises passing vapors of a glycol containing at least three carbon atoms, the hydroxyl-bearing carbon atoms of which are separated at the most by one methylene group, at about from 180° to 250° C. over a catalytic mass comprising copper and a difficultly reducible metal oxide.

10. The process for the production of ketones, which comprises passing vapors of a mixture of hydrogen and a glycol containing at least three carbon atoms, the hydroxyl-bearing carbon atoms of which are separated at the most by one methylene group, at about from 180° to 250° C. over a catalytic mass comprising copper.

In testimony whereof I have hereunto set my hand.

WALTER REPPE.